United States Patent [19]

Uchiyama et al.

[11] 4,053,035
[45] Oct. 11, 1977

[54] CURRENT COLLECTING SYSTEM FOR SELF-PROPELLED CARRIAGE OF AERIAL TRAMWAY

[75] Inventors: Hiromichi Uchiyama; Yukiyoshi Hatori, both of Tokyo, Japan

[73] Assignee: Nissan Motor Co., Ltd., Japan

[21] Appl. No.: 672,772

[22] Filed: Apr. 1, 1976

Related U.S. Application Data

[63] Continuation of Ser. No. 503,932, Sept. 6, 1974, abandoned.

[30] Foreign Application Priority Data

Sept. 28, 1973  Japan .................................. 48-112998

[51] Int. Cl.$^2$ ............................................... B60L 5/08
[52] U.S. Cl. ................................. 191/45 A; 104/93; 104/112; 191/22 R; 191/57
[58] Field of Search .............. 104/23 FS, 89, 93, 112, 104/115; 119/22 R, 23, 28, 29 R, 30-33 R, 35, 40, 41, 45 R, 45 A, 46-50, 57

[56] References Cited

U.S. PATENT DOCUMENTS

| | | | |
|---|---|---|---|
| 651,343 | 6/1900 | Chandler | 104/112 X |
| 1,401,650 | 12/1921 | Schaake | 191/40 |
| 1,509,522 | 9/1924 | Matthes | 191/59.1 X |
| 2,630,074 | 3/1953 | Grabinski | 104/112 |
| 3,858,520 | 1/1975 | Patin | 104/89 |

*Primary Examiner*—Stephen G. Kunin
*Attorney, Agent, or Firm*—Robert E. Burns; Emmanuel J. Lobato; Bruce L. Adams

[57] ABSTRACT

A cable holder device for holding current-carrying cables spaced apart but biased to maintain contact with two current-collecting shoes. The shoes are mounted on a self-propelled cable car having an electric drive motor connected to the shoes and driven apparatus constructed as a driven pulley for suspending the cable car on a suspension cable from which the cable car is suspended and on which it travels. The holder maintains positive contact between the current-carrying shoes and the current-carrying cables regardless of the swaying of the cables and the cable car.

2 Claims, 4 Drawing Figures

CURRENT COLLECTING SYSTEM FOR SELF-PROPELLED CARRIAGE OF AERIAL TRAMWAY

This is a continuation of application Ser. No. 503,932, filed Sept. 6, 1974, now abandoned.

BACKGROUND OF THE INVENTION

This invention relates to a current collecting system for a motor driven self-propelled carriage of an aerial tramway which is supported by a suspended cable.

As is well known, a motor driven self-propelled carriage of an aerial tramway, a kind of cable car, is used for long mountain ascents or to cross canyons or rivers. The carriage is generally supported by a supporting cable suspended between two or more towers. The carriage is suspended below the cable fitted with a grooved drive wheel that rides on the supporting cable. In addition, a current-carrying cable is suspended parallel to the supporting cable for providing a motor in the carriage with electric current.

However, with this aerial tramway, steady provision of the electric current is impossible because the suspended carriage and/or the current-carrying cable sway considerably and continuous contact between a current collecting shoe of the car chassis and a current-carrying cable is therefore broken.

SUMMARY OF THE INVENTION

Accordingly, it is an object of the present invention to provide an improved current collecting system of an aerial tramway which system is relatively simple in construction and will overcome the drawback encountered in the known art.

Another object of the present invention to provide an improved current collecting system for an aerial tramway which will supply a steady flow of electric current from the current-carrying cables to a carriage of aerial tramway.

Still another object of the present invention is to provide an improved current collecting system for an aerial tramway in which current collecting shoes of the carriage will provide a good contact with current-carrying cables.

BRIEF DESCRIPTION OF THE DRAWINGS

Other objects and advantages of the present invention will be more clearly understood when considered in connection with the accompanying drawings in which like reference numerals and characteristics designate corresponding parts and units in figures in which.

DESCRIPTION OF THE PREFERRED EMBODIMENTS

Figure 1:
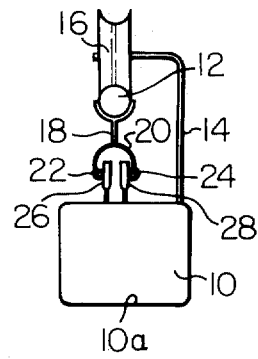
FIG. 1 is a schematic illustration showing an aerial tramway which incorporates an embodiment of a current collecting system according to the present invention.
Figure 2:
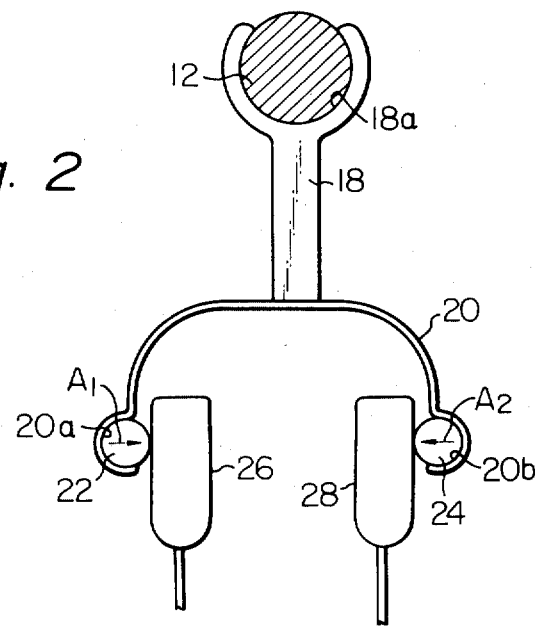
FIG. 2 is an enlarged view of the current collecting system in FIG. 1.

Referring now to FIGS. 1 and 2, one embodiment of a current collecting system of the present invention is illustrated as used with a common self-propelled carriage or cable car of an aerial tramway. A cable car or carriage 10 of the aerial tramway is supported in such a manner that the carriage 10 is suspended through a suspending member 14 by a supporting cable 12 and fitted with a grooved drive wheel 16 that rides on the cable 12. The cable 12 is generally suspended between two or more towers (not shown). The drive wheel 16 is generally driven by a motor (not shown) in the carriage 10 through any suitable connecting means.

A supporting member 18 is secured to the supporting cable 12 in such a manner as to partially enclose the cable 12 within an annular groove 18a thereof. At the lower end of the supporting member 18, a shaped holder 20 having spring or elastic characteristics is secured at the central portion thereof. The holder 20 has a pair of arcuate arms having a pair of grooves or open loops 20a and 20b electrically insulated from each other at the both ends thereof. Two current-carrying cables 22 and 24 are fixedly held within the grooves or open loops 20a and 20b of the holder 20 respectively.

A pair of current collecting shoes 26 and 28 are secured so as to be parallel to the direction of travel and vertical with respect to the carriage floor 10a. The shoes 26 and 28 are interposed between both ends of the shaped holder 20 in such a manner as to slidably contact the current-carrying cables 22 and 24. The shoes 26 and 28 are electrically connected to the motor (not shown) in the carriage 10.

It will be noted that since the shaped holder 20 has spring characteristics, the holder 20 always presses current-carrying cables 22 and 24 against the current collecting shoes 26 and 28 in the direction of arrows $A_1$ $A_2$ respectively. It will be understood that the holder 20 is so constructed as to maintain an adequate distance between the both ends of the holder 20 even when the current collecting shoes 26 and 28 are not being interposed between the ends of the holder 20.

Figure 3:
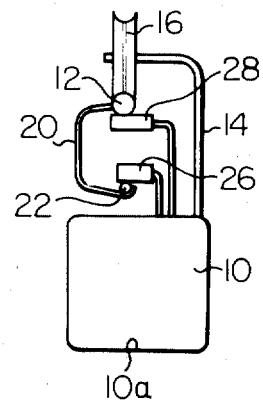
FIG. 3 is a schematic illustration showing an aerial tramway which incorporates another embodiment of a current collecting system according to the present invention.
Figure 4:
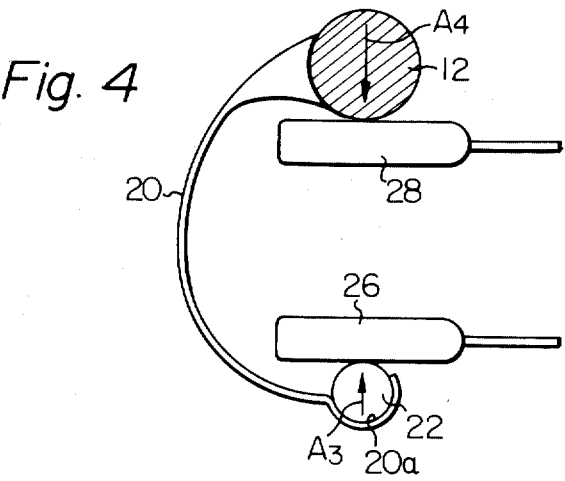
FIG. 4 is an enlarged view of the current collecting system in FIG. 3.

FIGS. 3 and 4 illustrate another embodiment of the current collecting system of the present invention which is used with a common self-propelled carriage of the aerial tramway.

The carriage of the aerial tramway is supported on a cable 12 by an insulated wheel 16 in the same manner as in FIGS. 1 and 2.

A supporting-shaped holder 20 having spring characteristics is secured to the supporting cable 12 which functions also as a current-carrying cable at one end thereof and the other end thereof is therefore suspended below the cable 12. A groove 20a is formed at the latter suspended end of the holder 20. A current-carrying cable 22 is secured within the groove 20a. The grrove 20a is electrically insulated from the cable 12.

A pair of current collecting shoes 26 and 28 are parallelly secured to the carriage 10 parallel to both the direction of travel and the carriage floor 10a. The shoes 26 and 28 are separately interposed between both ends of the shaped holder in such a manner as to slidably contact the current-carrying cable 22 and the cable 12 respectively. The shoes 26 and 28 are electrically connected to a motor (not shown) in the carriage 10.

It will be noted that the shaped holder 20 always presses the current-carrying cable 22 and the supporting cable 12 against the current collecting shoes 26 and 28 in the direction of arrows $A_3$ and $A_4$ respectively in the similar menner to the embodiment in FIG. 2.

It should be understood from the foregoing that since the current-carrying cables 22 and 24 are always pressed against the current collecting shoes 26 and 28, steady provision of the electric power can be accomplished even if the carriage 10 and/or the current-carrying cables 22 and 24 swing considerably.

It should also be understood that the foregoing relates to preferred embodiments of the present invention, and that it is intended to cover all changes and modifications of the example of the invention chosen for the purposes of the disclosure, which do not constitute depertures from the spirit and scope of the invention.

What is claimed is:

1. In an aerial tramway system having a self-propelled, travelling suspended cable car, a suspension cable for said cable car, a current-collecting system comprising two laterally disposed electrically conductive, current-collecting shoes spaced apart a fixed distance on said cable car and travelling therewith, two electrically conductive, current-carrying cables, a holder depending from said suspension cable and being spaced apart along the conductive cables, the holder having elastic means for elastically holding the conductive cables in a parallel spaced apart relationship a distance less than a distance between contact surfaces on the shoes which in turn make sliding contact with said cables, and said elastic means elastically biasing the conductive cables toward each other and toward respective ones of said contact surfaces for continuously making contact with the shoes as the cable car travels, and said shoes being disposed between the cables spaced downwardly from said elastic means.

2. In an aerial tramway system according to claim 1, in which said elastic means on said holder for holding the two current-carrying cables in spaced apart relationships comprises an arcuate elastic part thereof having at opposite ends thereof electrically-insulative, open loops within which the two cables are respectively disposed.

* * * * *